(12) United States Patent
Quilliard

(10) Patent No.: US 12,254,705 B2
(45) Date of Patent: Mar. 18, 2025

(54) METHOD FOR DETECTING AN EXIT LANE FOR A MOTOR VEHICLE

(71) Applicants: RENAULT s.a.s., Boulogne-Billancourt (FR); NISSAN MOTOR CO., LTD., Yokohama (JP)

(72) Inventor: Raphael Quilliard, Massy (FR)

(73) Assignees: AMPERE S.A.S., Boulogne-Billancourt (FR); NISSAN MOTOR CO., LTD., Yokohama (JP)

(*) Notice: Subject to any disclaimer, the term of this patent is extended or adjusted under 35 U.S.C. 154(b) by 519 days.

(21) Appl. No.: 17/621,051

(22) PCT Filed: Jun. 12, 2020

(86) PCT No.: PCT/EP2020/066256
§ 371 (c)(1),
(2) Date: Dec. 20, 2021

(87) PCT Pub. No.: WO2021/001133
PCT Pub. Date: Jan. 7, 2021

(65) Prior Publication Data
US 2022/0366704 A1    Nov. 17, 2022

(30) Foreign Application Priority Data
Jul. 2, 2019  (FR) ...................... 1907317

(51) Int. Cl.
*G06V 20/56* (2022.01)
*B60W 30/12* (2020.01)

(52) U.S. Cl.
CPC ........... *G06V 20/588* (2022.01); *B60W 30/12* (2013.01); *G06V 20/56* (2022.01); *B60W 2420/403* (2013.01); *B60W 2552/53* (2020.02)

(58) Field of Classification Search
CPC ..... G06V 20/588; G06V 20/56; B60W 30/12; B60W 2420/403; B60W 2552/53
See application file for complete search history.

(56) References Cited

U.S. PATENT DOCUMENTS

| | | |
|---|---|---|
| 6,691,018 B1 | 2/2004 | Miyahara |
| 2017/0091564 A1* | 3/2017 | Kawasaki .............. G01C 21/30 |
| 2022/0097696 A1* | 3/2022 | Van Dan Elzen .... B60W 50/14 |

OTHER PUBLICATIONS

International Search Report mailed on Jul. 6, 2020 in PCT/EP2020/066256 filed on Jun. 12, 2020 (2 pages).

(Continued)

*Primary Examiner* — Matthew C Bella
*Assistant Examiner* — Andrew B. Jones
(74) *Attorney, Agent, or Firm* — Oblon, McClelland, Maier & Neustadt, L.L.P.

(57) ABSTRACT

A method for detecting an exit lane for a motor vehicle includes: detecting, in images acquired by an onboard camera, marking lines on the ground on the right and on the left laterally delimiting the main traffic lane, determining first and second heading angles with respect to the detected marking lines, providing a first, standard exit lane detection state, based on the comparison of the first and second heading angles with a predetermined threshold, and providing a second, coaxial exit lane detection state, based on the comparison between the derivatives with respect to time of the variation of the first and second heading angles and of the verification that the value of the first or the second heading angle remains substantially close to a zero value.

10 Claims, 3 Drawing Sheets

(56) References Cited

OTHER PUBLICATIONS

French Preliminary Search Report (with English translation of Categories of Cited Documents) issued on Mar. 18, 2020 in French Application 1907317 filed on Jul. 2, 2019 (3 pages).

* cited by examiner

METHOD FOR DETECTING AN EXIT LANE FOR A MOTOR VEHICLE

BACKGROUND

The present invention relates to the field of controlling the trajectory of a motor vehicle by detecting road markings on the ground using a camera, in particular a camera on board a motor vehicle. It relates more particularly to a method for detecting the approach of an exit lane for a motor vehicle.

The invention advantageously applies to the implementation of systems for managing the level of autonomy of self-driving motor vehicles, for which it is essential to be able to reliably control the positioning of the vehicle in its environment. In particular, the problem of controlling the trajectory of a vehicle is today at the heart of the first levels of autonomy of vehicles that allow phases of self-driving, that is to say during which they are driven in an automated manner, without the driver acting on the steering wheel or the pedals.

Algorithms, implemented in the video processing unit which retrieves the video stream from the onboard camera on the vehicle, are known which make it possible to extract the lines of road markings on the ground from the video stream, to detect the position of the motor vehicle with respect to the road markings on the ground, and to correct the trajectory of the vehicle with respect to the detected road markings. What is meant by "marking" is a line on the ground of a different color from the roadway and which bounds one side of a traffic lane. The marking line on the ground may be continuous or broken.

The majority of the approaches used by detection algorithms, however, suffer from weaknesses in certain common realistic situations such as approaching what is referred to as a coaxial exit with respect to the main lane along which the vehicle is traveling, that is to say an exit that has a deceleration lane substantially in the continuation of the main lane along which the vehicle is traveling. In the present application, what is meant by "deceleration lane substantially in the continuation of the main lane" is that the exit lane substantially follows the tangent to the main lane.

Today, the detection of the exit lanes at a junction with respect to a main lane along which the vehicle is traveling may be established on the basis of the value of the heading angles of the vehicle with respect to the observed lines, that is to say the angles between the ground marking line on the left and the ground marking line on the right, respectively, of a lane and the reference frame of the vehicle. Thus, as illustrated in FIG. 1, $\psi_R$ is the heading angle of the vehicle 10 with respect to the marking line on the right L1 and $\psi_L$ is the heading angle of the vehicle with respect to the marking line on the left L2.

For most exits, a significant increase in the heading angle may be observed on the side of the exit lane. For example, at the start of an exit on the right, the heading angle on the right increases sharply. Thus, this exit may be detected by comparing the heading angle $\Psi_R$ with a predetermined threshold.

Conversely, in situations where the exit lane is substantially in the continuation of the main lane, the configuration of the road marking lines may "trick" the detection algorithm, insofar as, in these situations, there is no sharp increase in the heading angle on the side of the exit. These situations typically concern deceleration lanes leading to a highway exit or deceleration lanes leading to a highway service area.

FIG. 2 shows an example which illustrates this problem. The main lane along which the vehicle is traveling is the right-hand lane D of the road denoted by 1 and is bounded by the ground marking lines 2 and 3, laterally bounding the main traffic lane for the vehicle on the right and on the left. This traffic lane turns substantially to the left, while in the immediate vicinity ahead of the vehicle, there is a deceleration lane 4 substantially in the continuation of the main lane D for the vehicle with respect to the current position of the vehicle in its lane. The exit line 5 on the ground bounding this deceleration lane 4 on the right is substantially straight, while the ground marking line 3 bounding the main lane D on the right curves substantially to the left. In other words, here, the detection algorithm which processes the data provided by the onboard camera should normally extract information therefrom with respect to the road marking for the main lane, namely the ground marking lines 2 and 3, and determine corrective actions to be applied to the vehicle trajectory so that the vehicle trajectory is effectively based on the detection of the ground marking lines 2 and 3, thus allowing the vehicle to remain in the main lane. However, due to the configuration of the ground marking lines of the main lane D and of the deceleration lane 4, respectively, which deceleration lane is located substantially in the continuation of the main lane, the detection algorithm may incorrectly detect the exit line 5 of the deceleration lane 4 as the ground marking of the main lane. By mistakenly detecting this line as being a ground marking line of the main lane, the corrective action applied to the trajectory of the vehicle will cause this vehicle to leave the main lane and take the deceleration lane, which is not the desired action.

Document US2018156626 discloses a system that makes it possible to control the trajectory of a vehicle along a "normal" route by detecting and following, using an onboard camera, a ground marking line of the lane in which the vehicle is traveling and by determining, on approaching a highway entry or exit lane, whether or not the ground marking line should still be followed according to the "normal" route to be followed by the vehicle. More precisely, the detection of the ground marking line is based on information on the color of the ground marking line. Thus, according to information on the color of a predetermined ground marking line corresponding to the "normal" driving route, if the color of the ground marking line which is detected is identical to the information regarding the color of the predetermined ground marking line, the detected line continues to be followed, otherwise it is interrupted.

Thus, this system should a priori be robust with respect to line detection errors related to the approach of coaxial exit lanes, since the detection of ground marking lines is not based on angle measurements. However, detection here relies on an analysis of the colors of the detected ground marking lines, which is not without drawbacks. In particular, the following and recognition of road marking lines may be dependent on the conditions of acquisition of the images on board, which are liable to be subjected to projected shadows, glare, etc., thus making their use troublesome in terms of fine color analysis.

BRIEF SUMMARY

Thus, an aim of the invention is to provide a method for detecting the approach of an exit lane, which makes it possible in particular to be able to detect, in a simple and robust manner, the approach of an exit lane that is coaxial with the main lane for the vehicle, so as to be able, where necessary, to correct the position of the vehicle so that it remains in its lane.

To that end, the invention relates to a method for detecting an exit lane for a motor vehicle on the basis of a succession of images from ahead of the vehicle which are acquired by a camera on board the vehicle as it moves along a main traffic lane bounded laterally by ground marking lines located along the right-hand edge and left-hand edge of said traffic lane, said method comprising:

- a step for detecting, in said images, the right-hand ground marking line and the left-hand ground marking line,
- a step for determining a first heading angle of the vehicle with respect to the detected right-hand ground marking line and a second heading angle of the vehicle with respect to the detected left-hand ground marking line,
- a step able to provide a first exit lane detection state, representative of the detection of a standard exit lane on the right or on the left, respectively, according to the comparison of the values of the first heading angle or of the second heading angle, respectively, with a predetermined threshold,
- said method being characterized in that it further comprises a step able to provide a second exit lane detection state, representative of the detection of an exit lane on the right or on the left, respectively, coaxial with the main traffic lane, according to, first, the comparison between the derivatives with respect to time of the variation in the first and second heading angles and, second, the verification that the value of the first heading angle or of the second heading angle, respectively, remains substantially close to a zero value.

Thus, by virtue of the verification tests performed on the change in the two heading angles of the vehicle with respect to the ground marking lines detected on the right and on the left, the second detection state advantageously makes it possible to detect what are referred to as coaxial exit lanes with respect to the main traffic lane, which are not taken into account by the first detection state, this being limited to what are referred to as standard exit lanes, for which a simple increase with respect to a given threshold of the heading angle of the vehicle on the side of the exit may be observed. Thus, in the present application, the expression "standard exit" refers to an exit that is not coaxial with the main traffic lane, i.e. does not have a deceleration lane in the continuation of the main lane along which the vehicle is traveling.

Thus, in the event of an ambiguous ground marking, typically for exit lanes that are coaxial with the main traffic lane, the method of the invention makes it possible to detect them in a robust manner with the aim of correcting the position of the vehicle entering such an exit lane by mistake.

The detection of exit lanes according to the present invention is suitable both for exit lanes on the right and for exit lanes on the left, which affords the solution a great deal of flexibility, being applicable to any type of vehicle, both to those designed for countries where legislation dictates driving on the left and to those designed for countries where legislation dictates driving on the left.

Advantageously, the method comprises, when a second detection state has been provided, arbitrating between the first and second exit lane detection states so as to grant processing priority to said first detection state.

Advantageously, said second exit lane detection state for a coaxial exit lane on the right or on the left, respectively, is provided when the derivative with respect to time of the variation in the second heading angle or in the first heading angle, respectively, is greater than the derivative with respect to time of the variation in the first heading angle or in the second heading angle, respectively, with the addition of a predefined minimum margin, and the value of the first heading angle or of the second heading angle, respectively, is zero to within a predetermined tolerance threshold.

Advantageously, said first exit lane detection state for a standard exit lane on the right or on the left, respectively, is provided when the value of the first heading angle or of the second heading angle, respectively, is higher than said predetermined threshold.

Advantageously, the method comprises a step of correcting the position of the ground marking line detected on the side where an exit lane has been detected according to the first or the second exit lane detection state.

Advantageously, the correction of said ground marking line detected on the side of the detected exit lane consists in reconstructing a corrected ground marking line on the side of the detected exit lane according to the position of the ground marking line detected on the opposite side with respect to the detected exit lane and a measurement of the traffic lane width acquired using the camera.

Advantageously, said measurement of the traffic lane width consists of a measurement value fixed at the measurement value acquired at a time preceding the detection of said exit lane.

Advantageously, the method comprises a step of correcting the lateral position of the vehicle in its traffic lane according to the respective positions of the ground marking line detected on the opposite side with respect to the detected exit lane and of the corrected ground marking line on the side of the detected exit lane.

The invention also relates to a device for detecting an exit lane for a motor vehicle traveling on a main traffic lane bounded laterally by ground marking lines, characterized in that it comprises at least one processing unit suitable for cooperating with a front camera with which the vehicle is equipped and for implementing the steps of the method as described above.

The invention also relates to a motor vehicle, characterized in that it comprises at least one onboard front camera and a device as described above.

BRIEF DESCRIPTION OF THE DRAWINGS

Other features and advantages of the present invention will become more clearly apparent from reading the following description given by way of illustrative and non-limiting example and provided with reference to the single following figure.

DETAILED DESCRIPTION

Figure 1:
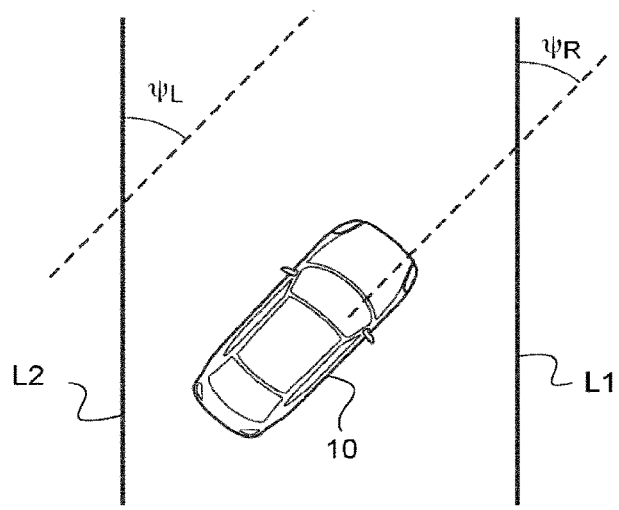
FIG. 1 schematically illustrates the concept of the heading angle of the vehicle with respect to the right-hand and left-hand ground marking lines.
Figure 2:
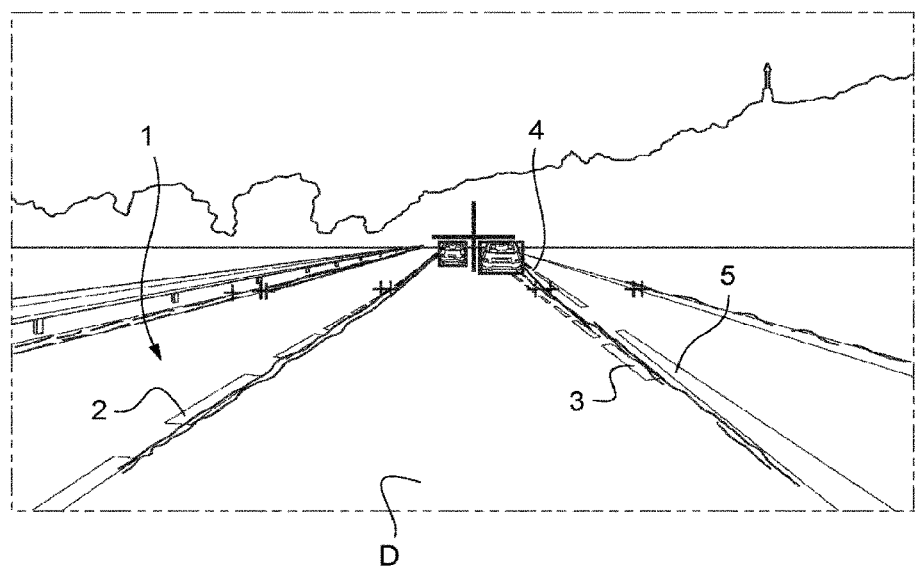
FIG. 2 schematically illustrates the problem of ambiguous ground markings for what are referred to as coaxial exit lanes, misleading the line detection system based on the camera.
Figure 3:
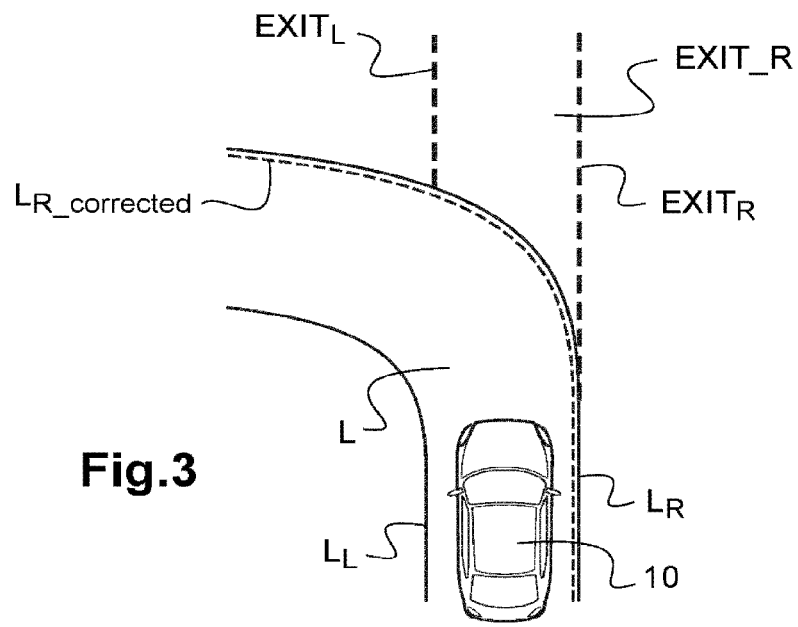
FIG. 3 schematically illustrates the principle of detecting an exit lane in the context of detecting a coaxial exit lane on the right.

FIG. 3 schematically shows an exemplary situation of a vehicle 10 traveling along a main traffic lane L, bounded laterally by road marking lines, namely a right-hand ground marking line $L_R$ located along the right-hand edge of the main traffic lane L and a left-hand ground marking line $L_L$ located along the left-hand edge of the main traffic lane L.

The vehicle 10 is equipped with an assistance system generally known by the name of "lane centering assist", or by the acronym LCA, which consists in detecting the position of the motor vehicle with respect to the road marking lines and in correcting the trajectory of the vehicle so as to automatically keep the vehicle centered in its lane, relieving the driver of the task of steering. The LCA system therefore acts on the steering column of the vehicle when it becomes necessary to correct the trajectory.

The LCA system generally comprises a camera oriented ahead of the motor vehicle, for example installed at the top of the windshield, at the junction with the roof of the vehicle, or else installed behind the interior rear-view mirror of the vehicle, so as to make it possible to acquire images of the scene located ahead of the vehicle and to be able to detect the road marking ahead of the motor vehicle.

To do this, the step of acquiring images by means of the camera is followed by a step in which a processing unit associated with the camera retrieves the stream of images provided by the camera and analyzes it using image processing techniques, in particular to detect the road marking lines located along the traffic lane L taken by the motor vehicle 10. The processing unit is also suitable for providing an estimate of the two heading angles of the vehicle with respect to road marking lines detected on either side of the vehicle.

FIG. 3 illustrates a forking of the main lane comprising a right-hand exit lane EXIT_R, which extends in the continuation of the main traffic lane L for the vehicle, while the latter lane branches off to the left at the fork. The right-hand exit lane is what is referred to as an exit lane coaxial with the main traffic lane, that is to say an exit lane that is substantially in the continuation of the main lane. This coaxial exit lane EXIT_R is itself bounded laterally by road marking lines, namely a right-hand ground marking line $EXIT_R$ located along the right-hand edge of the right-hand coaxial exit lane EXIT_R and a left-hand ground marking line $EXIT_L$ located along the left-hand edge of the right-hand coaxial exit lane EXIT_R.

This forking situation illustrated in FIG. 3 typically describes the configuration of an ambiguous ground marking, liable to "trick" the detection algorithm normally used by the camera, which is based on the comparison of the value of the heading angles of the vehicle with a predetermined threshold. Thus, at the start of detection, on approaching the right-hand coaxial exit lane EXIT_R, the vehicle camera may incorrectly detect the right-hand ground marking line $EXIT_R$ located along the right-hand edge of the right-hand coaxial exit lane EXIT_R as the ground marking of the main lane L, which may result in unwanted corrective action being applied to the vehicle trajectory, causing it to take the right-hand coaxial exit lane EXIT_R, whereas it should actually remain in the main traffic lane L which turns to the left. In other words, this type of coaxial exit lane is not detected by the conventional detection algorithm associated with the camera, which incorrectly takes this type of coaxial exit lane to be the main traffic lane for the vehicle.

In this regard, the invention provides for the implementation of a second detection algorithm, intended to unambiguously detect this type of coaxial exit lane, such as the right-hand coaxial exit lane EXIT_R according to the example of FIG. 3, so as to be able to correct the trajectory of the vehicle so that it remains in its main traffic lane. In general, this detection algorithm is designed to detect a coaxial exit lane first by comparing the average derivative of the two heading angles on the right and on the left over a certain period and second by verifying that the heading angle of the vehicle with respect to the road marking line detected on the side of the exit lane is indeed zero.

Thus, by applying this general principle to the example of FIG. 3, the coaxial exit lane detection algorithm is able to provide a detection state representative of the detection of the right-hand coaxial exit lane EXIT_R when the following two cumulative conditions are met, namely when the heading angle on the left increases more than the heading angle on the right and the heading angle on the right remains close to the zero value, to within a predetermined tolerance threshold. This last condition for the heading angle on the right, which must remain at a value close to zero, makes it possible to eliminate a case of valid detection of a left-hand exit lane, in which case the heading angle on the right would not stay close to zero.

This twofold test, implemented by the coaxial exit lane detection algorithm to determine whether the vehicle is approaching a right-hand coaxial exit lane, may take the form of the following twofold expression:

[Math. 1]

$$\frac{\psi_L(k) - \psi_L(k - nDelay)}{nDelay} > \frac{\psi_R(k) - \psi_R(k - nDelay)}{nDelay} + \text{Margin} \quad (1)$$

$$\psi_R(k) < \varepsilon$$

where:
nDelay: the number of time intervals representing the period used for the derivative of the two heading angles on the left $\psi_L$ and on the right $\psi_R$;
k: the time interval;
Margin: a safety margin, allowing untimely detections to be avoided;
$\varepsilon$: the predetermined tolerance threshold for testing the zero value of the heading angle on the right.

Criterion (1) above therefore makes it possible to differentiate between a right-hand coaxial exit lane and a left-hand coaxial exit lane. Specifically, for a right-hand coaxial exit lane, the heading angle on the right $\psi_R$ will be low or even zero. It is therefore verified that its value is lower than the predetermined tolerance threshold $\varepsilon$.

Figure 4:
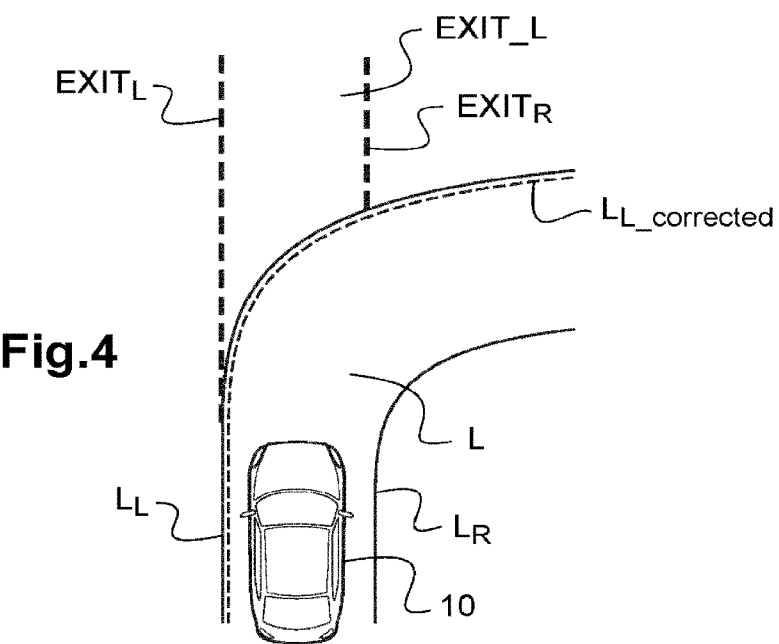
FIG. 4 schematically illustrates the principle of detecting an exit lane in the context of detecting a coaxial exit lane on the left.

The principle of detecting a coaxial exit lane on the right that has just been described with reference to FIG. 3 benefits from a perfectly symmetrical application for the detection of a coaxial exit lane on the left, as illustrated by the example of FIG. 4.

Thus, the forking illustrated in FIG. 4 comprises a left-hand exit lane EXIT_L, which extends in the continuation of the main traffic lane L for the vehicle, while the latter lane branches off to the right at the fork. This left-hand coaxial exit lane EXIT_L is itself bounded laterally by road marking lines, namely a right-hand ground marking line $EXIT_R$ located along the right-hand edge of the left-hand coaxial exit lane EXIT_L and a left-hand ground marking line EXIT$_L$ located along the left-hand edge of the left-hand coaxial exit lane EXIT_L.

The coaxial exit lane detection algorithm then provides a detection state representative of the detection of the left-hand coaxial exit lane EXIT_L when the following two cumulative conditions are met, namely when the heading angle on the right of the vehicle increases more than the heading angle on the left and the heading angle on the left remains close to zero, to within a predetermined tolerance threshold.

In this situation, the twofold test implemented by the detection algorithm to determine whether a left-hand coaxial exit lane is being approached takes the following form:

[Math. 2]

$$\frac{\psi_R(k) - \psi_R(k - nDelay)}{nDelay} > \frac{\psi_L(k) - \psi_L(k - nDelay)}{nDelay} + \text{Margin} \quad (2)$$

$$\psi_L(k) < \varepsilon$$

As in the previous situation, criterion (2) makes it possible to differentiate between a right-hand coaxial exit lane and a left-hand coaxial exit lane. Specifically, for a left-hand coaxial exit lane, the heading angle on the left $\psi_L$ will be low or even zero. It is therefore verified that its value is lower than the predetermined tolerance threshold $\varepsilon$.

Thus, detections of left-hand and right-hand coaxial exit lanes cannot coexist by virtue of the application of criteria (1) and (2). Specifically, it is not possible for both the heading angle on the right and the heading angle on the left to be zero at the same time and an exit lane to be detected simultaneously.

The camera is therefore associated with a first detection algorithm which is conventionally intended to detect exit lanes according to the comparison of the value of the heading angles of the vehicle on the right and on the left, respectively, with a predetermined threshold. Specifically, for most "standard" exit lanes, a clear increase in the heading angle with respect to the line detected on the side of the exit lane may be observed. This algorithm is therefore able to provide a first detection state representative of the detection of a "standard", as opposed to a coaxial, exit lane on the right or on the left. This first detection algorithm does not, however, make it possible to detect coaxial exit lanes on the right and on the left, respectively, as illustrated in the examples of FIGS. 3 and 4, hence the second algorithm implemented as described above, provided for this purpose.

In other words, the controller of the LCA system, which is intended to correct the trajectory of the vehicle so that it remains in its lane at the forks encountered, processes information for detecting exit lanes from multiple sources, corresponding to the detection states provided by the first and second detection algorithms.

Advantageously, provision is made to arbitrate between these exit lane detection states so as to grant processing priority to the detection state provided by the first detection algorithm. This arbitration giving priority to the detection state provided by the first detection algorithm makes it possible to avoid regression in the correction system which is already present, which is based on the information for detecting standard exit lanes on the right and on the left provided by the first detection algorithm. In particular, the priority given to the detection state provided by the first detection algorithm makes it possible to avoid ending up in a situation of false detection, in which a coaxial exit lane on the right or on the left, respectively, is incorrectly detected instead of a standard exit lane on the left or on the right, respectively.

Figure 5:
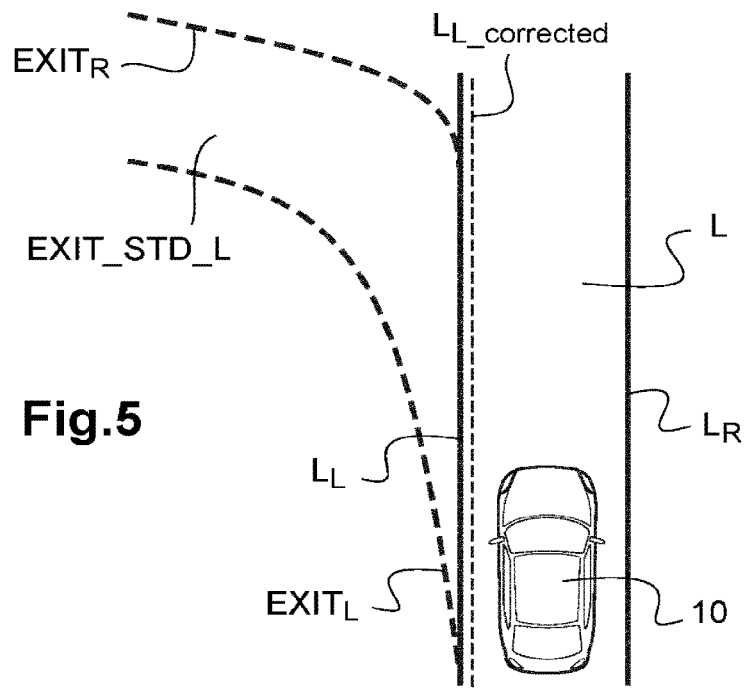
FIG. 5 schematically illustrates the principle of detecting an exit lane in the context of detecting a standard exit lane on the left.

FIG. 5 describes a forking configuration illustrating the advantage of this arbitration. The fork comprises here a standard exit lane on the left EXIT_STD_L with respect to the main traffic lane L for the vehicle, on the side of which may be observed a sharp increase in the heading angle on the left with respect to the road marking line EXIT$_L$, located along the left-hand edge of the standard exit lane on the left EXIT_STD_L. In this case, the algorithm for detecting standard exit lanes therefore does indeed provide a detection state representative of the detection of the standard exit lane on the left EXIT_STD_L. At the same time, the coaxial exit lane detection algorithm also provides a detection state representative of the detection of a coaxial exit lane on the right, since both conditions are satisfied, namely the heading angle on the left with respect to the road marking line EXIT$_L$ increasing more than the heading angle on the right with respect to the road marking line L$_R$ and the heading angle on the right remaining very close to the zero value. However, this last detection state is not considered, because it has lower priority than the detection state of the standard exit lane on the left. Thus, arbitration makes it possible to take account of detections according to a priority scheme dictating that detection resulting from the first algorithm for detecting standard exit lanes be considered first and then detection resulting from the second algorithm for detecting coaxial exit lanes is considered only if no detection state is provided by the first detection algorithm, in other words, if no standard exit lane is detected.

This principle of arbitration between the two types of detection applies in the same way to make it possible to avoid detecting a coaxial exit lane on the left when a standard exit lane on the right should be detected.

Figure 6:
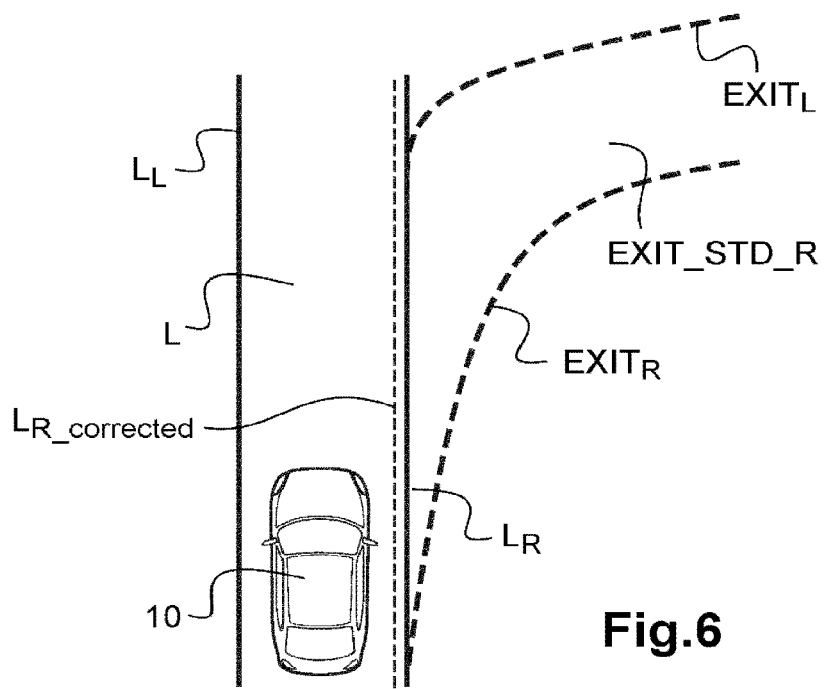
FIG. 6 schematically illustrates the principle of detecting an exit lane in the context of detecting a standard exit lane on the right.

Thus, FIG. 6 describes a forking configuration in which a standard exit lane on the right should be detected in order to be able to correct the trajectory correctly.

The fork comprises here a standard exit lane on the right EXIT_STD_R with respect to the main traffic lane L for the vehicle, on the side of which may therefore be observed a sharp increase in the heading angle on the right with respect to the road marking line EXIT$_R$, located along the right-hand edge of the standard exit lane on the right EXIT_STD_R. In this case, the algorithm for detecting standard exit lanes therefore does indeed provide a detection state representative of the detection of the standard exit lane on the right EXIT_STD_R. At the same time, the coaxial exit lane detection algorithm also provides a detection state representative of the detection of a coaxial exit lane on the left, since both conditions are satisfied, namely the heading angle on the right with respect to the road marking line EXIT$_R$ increasing more than the heading angle on the left with respect to the road marking line L$_L$ and the heading angle on the left remaining very close to the zero value. However, by virtue of the arbitration, this last detection state is not considered, because it has lower priority than the detection state of the standard exit lane on the right.

This priority scheme resulting from the arbitration implemented, which dictates first considering the detection resulting from the first detection algorithm and then that resulting from the second detection algorithm only if the first algorithm has not detected anything, may take the following form, for example in the case of detection of an exit lane on the right, where detection_camera_right corresponds to the detection state provided by the first standard exit lane detection algorithm and detection_coaxial_right corresponds to the detection state provided by the second coaxial exit lane detection algorithm:

Detection_right=detection_camera_right OR [detection_coaxial_right AND NOT(detection_camera_right)]   [5]

In this way, the information for detecting coaxial exit lanes is processed as additional information, making it possible to detect a coaxial exit lane that has not been returned by the first detection algorithm.

Now that detection of exit lanes on the right or on the left has been made robust in all of these forking situations described above, the position of the road marking lines will next be corrected to ensure that the vehicle remains in its main traffic lane. To do this, the ground marking line detected on the side of the detected exit lane will be corrected by reconstructing a corrected ground marking line on the side of the detected exit lane according to the position of the ground marking line detected on the opposite side with respect to the detected exit lane and a measurement of the traffic lane width acquired using the camera.

Thus, when the detection of road marking lines $L_R$ and $L_L$ laterally bounding the main traffic lane L is performed by the image processing unit associated with the camera, the respective lateral positions of the ground marking lines $L_R$ and $L_L$ with respect to the camera in the reference frame of the vehicle are also determined.

Let $pos_R$ and $pos_L$ be the respective lateral positions of these ground marking lines with respect to the camera in the reference frame of the vehicle.

On the basis of these respective lateral positions, the width of the main traffic lane L is calculated. Let LW(k) be the lane width calculated at a time k on the basis of the absolute values of these respective lateral positions:

$$LW(k) = abs(pos_R) + abs(pos_L) \quad \text{[Math. 3]}$$

As soon as an exit lane is detected, on the left or on the right, according to the principles of the invention set out above, the lane width thus determined is fixed at its previous value and maintained over time until the end of the exit lane is detected. This makes it possible to maintain a reliable lane width. Next, the ground marking line located on the side of the detected exit lane is reconstructed on the basis of the lateral position of the ground marking line detected on the opposite side and of the fixed value of the lane width. In this way, the reconstructed ground marking line follows the variation in the ground marking line detected on the opposite side with respect to the detected exit lane, but transferred over to the other side of the main traffic lane, that is to say to the side of the detected exit lane where the ground marking line, on the basis of which it is desired to control the trajectory of the vehicle using the LCA system, is located. In other words, the correction applied to the ground marking line located on the side of the detected exit lane is applied by symmetrizing the ground marking line detected on the opposite side with respect to the camera.

For example, according to the example of FIG. 3, when the coaxial exit lane on the right EXIT_R is detected, the position of the right-hand ground marking line bounding the main traffic lane L on the side of the exit lane EXIT_R is corrected as follows, at each time interval between the start and the end of detection of the coaxial exit lane on the right EXIT_R:

$$pos_{R,corrected}(k) = pos_L(k) + LW(k-1) \quad \text{[Math. 4]}$$

where $pos_{R,corrected}(k)$ is the corrected lateral position with respect to the camera of the right-hand marking line at time k, $pos_L(k)$ is the lateral position with respect to the camera of the left-hand ground marking line determined at time k, and LW(k−1) is the lane width determined at time (k−1) preceding the detection of the coaxial exit lane on the right.

This correction makes it possible to reconstruct a right-hand ground marking line, denoted by $L_{R\_corrected}$ in FIG. 3, bounding the main traffic lane L on the side of the detected coaxial exit lane on the right EXIT_R.

This corrected right-hand ground marking line $L_{R\_corrected}$ follows, symmetrically with respect to the camera, the variation in the left-hand ground marking line $L_L$. This correction of the line located on the side of the detected exit lane thus allows the LCA system to have the correct line reference, namely $L_{R\_corrected}$, in order to correct the trajectory of the vehicle, so as to automatically keep the vehicle centered in its main traffic lane L.

In the cases of the examples described above in FIGS. 4, 5 and 6, this line correction principle applies in the same way as soon as an exit lane is detected. Thus, in all of these cases, the ground marking line located on the side of the detected exit lane is corrected, making it possible to correct the trajectory so that the vehicle remains in its main traffic lane. For example, in the case of the detection of the standard exit lane on the left illustrated in FIG. 5, the standard exit lane on the left EXIT_STD_L is indeed detected by the first detection algorithm and according to the principles set out above, the corrected left-hand ground marking line $L_{L\_corrected}$ is reconstructed which follows, symmetrically with respect to the camera, the variation in the right-hand ground marking line $L_R$.

The invention claimed is:

1. A method for detecting an exit lane for a motor vehicle based on a succession of images from ahead of the vehicle which are acquired by a camera on board the vehicle as the vehicle moves along a main traffic lane bounded laterally by ground marking lines located along a right-hand edge and a left-hand edge of said traffic lane, said method comprising:
   detecting, in said images, the right-hand ground marking line and the left-hand ground marking line,
   determining a first heading angle of the vehicle with respect to the detected right-hand ground marking line and a second heading angle of the vehicle with respect to the detected left-hand ground marking line,
   providing a first exit lane detection state, representative of detecting a standard exit lane on the right or on the left according to a comparison of the values of the first heading angle or of the second heading angle with a predetermined threshold,
   providing a second exit lane detection state, representative of detecting an exit lane on the right or on the left coaxial with a continuation of the main traffic lane, according to, first, a comparison between derivatives with respect to time of a variation in the first and second heading angles and, second, a verification that the value of the first heading angle or of the second heading angle remains substantially close to a zero value; and
   correcting a trajectory of the motor vehicle using the first or the second exit lane detection state.

2. The method as claimed in claim 1, further comprising, when the second exit lane detection state has been provided, arbitrating between the first and second exit lane detection states so as to grant processing priority to said first detection state.

3. The method as claimed in claim 1, wherein said second exit lane detection state for a coaxial exit lane on the right or on the left, respectively, is provided when the derivative with respect to time of the variation in the second heading angle or in the first heading angle, respectively, is greater than the derivative with respect to time of the variation in the first heading angle or in the second heading angle, respectively, with the addition of a predefined minimum margin, and the value of the first heading angle or of the second heading angle, respectively, is zero to within a predetermined tolerance threshold.

4. The method as claimed in claim 1, wherein said first exit lane detection state for a standard exit lane on the right or on the left, respectively, is provided when the value of the first heading angle or of the second heading angle, respectively, is higher than said predetermined threshold.

5. The method as claimed in claim 1, further comprising correcting a position of the ground marking line detected on the side where an exit lane has been detected according to the first or the second exit lane detection state.

6. The method as claimed in claim 5, wherein the correction of said ground marking line detected on the side of the detected exit lane includes reconstructing a corrected ground marking line on the side of the detected exit lane according to a position of the ground marking line detected on the opposite side with respect to the detected exit lane and a measurement of a width of the traffic lane acquired using the camera.

7. The method as claimed in claim 6, wherein said measurement of the width of the traffic lane includes a measurement value fixed at the measurement value acquired immediately before the detection of said exit lane.

8. The method as claimed in claim 6, further comprising correcting a lateral position of the vehicle in its traffic lane according to the respective positions of the ground marking line detected on the opposite side with respect to the detected exit lane and of the corrected ground marking line on the side of the detected exit lane.

9. A device for detecting an exit lane for a motor vehicle based on a succession of images from ahead of the vehicle which are acquired by a camera on board the vehicle as the vehicle moves along a main traffic lane bounded laterally by ground marking lines located along a right-hand edge and a left-hand edge of said traffic lane, comprising:
  at least one processing unit configured to cooperate with a front camera with which the vehicle is equipped and configured to
    detect, in said images, the right-hand ground marking line and the left-hand ground marking line,
    determine a first heading angle of the vehicle with respect to the detected right-hand ground marking line and a second heading angle of the vehicle with respect to the detected left-hand ground marking line,
    provide a first exit lane detection state, representative of detecting a standard exit lane on the right or on the left according to a comparison of the values of the first heading angle or of the second heading angle with a predetermined threshold,
    provide a second exit lane detection state, representative of detecting an exit lane on the right or on the left coaxial with a continuation of the main traffic lane, according to, first, a comparison between derivatives with respect to time of a variation in the first and second heading angles and, second, a verification that the value of the first heading angle or of the second heading angle remains substantially close to a zero value, and
    correct a trajectory of the motor vehicle using the first or the second exit lane detection state.

10. A motor vehicle, comprising:
at least one onboard front camera; and
a device for detecting an exit lane for the motor vehicle based on a succession of images from ahead of the vehicle which are acquired by the at least one onboard front camera as the vehicle moves along a main traffic lane bounded laterally by ground marking lines located along a right-hand edge and a left-hand edge of said traffic lane, comprising:
at least one processing unit configured to cooperate with a front camera with which the vehicle is equipped and configured to
  detect, in said images, the right-hand ground marking line and the left-hand ground marking line,
  determine a first heading angle of the vehicle with respect to the detected right-hand ground marking line and a second heading angle of the vehicle with respect to the detected left-hand ground marking line,
  provide a first exit lane detection state, representative of detecting a standard exit lane on the right or on the left according to a comparison of the values of the first heading angle or of the second heading angle with a predetermined threshold,
  provide a second exit lane detection state, representative of detecting an exit lane on the right or on the left coaxial with a continuation of the main traffic lane, according to, first, a comparison between derivatives with respect to time of a variation in the first and second heading angles and, second, a verification that the value of the first heading angle or of the second heading angle remains substantially close to a zero value, and
  correct a trajectory of the motor vehicle using the first or the second exit lane detection state.

* * * * *